Sept. 29, 1931.  E. B. YOUNG  1,825,035
DROPPER VALVE FOR CORN PLANTERS
Filed Jan. 31, 1931
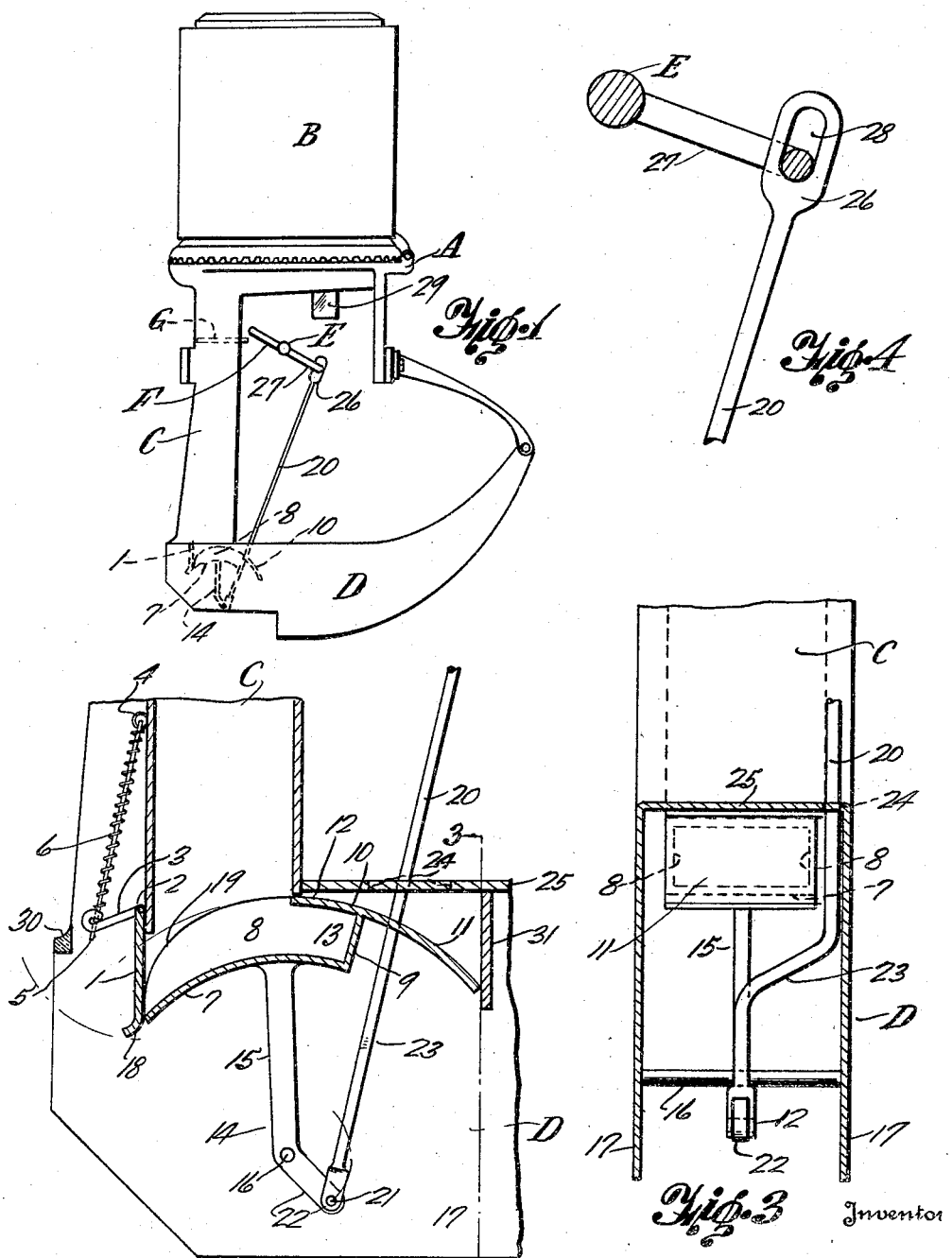

Patented Sept. 29, 1931

1,825,035

UNITED STATES PATENT OFFICE

EDGAR B. YOUNG, OF NEWMAN, ILLINOIS

DROPPER VALVE FOR CORN PLANTERS

Application filed January 31, 1931. Serial No. 512,583.

My invention relates to improvements in corn planters and more particularly to the seed dropping valves thereof.

The main object of the invention is to provide a valve so constructed and operated as to collect and throw the desired number of kernels of corn downward and slightly rearward from the planter runners or shoes with sufficient force to prevent scattering of the corn which normally occurs when the corn is simply dropped to the ground. The effect of the momentum of the planter is thus overcome and the planter may be run at a considerably greater speed without scattering the corn.

A further object of the invention is to provide a valve of the above characteristics in a simple, efficient and inexpensive form and which operates in connection and cooperation with the usual upper corn dropping valve on the planter.

With these and other objects in view the invention resides in the novel construction and arrangement of parts as hereinafter set forth and claimed, reference being had to the accompanying drawings wherein:

Figure 1 is a side view of a corn hopper, runner and portion of the frame of a conventional planter showing the manner of applying the present invention thereto.

Figure 2 is an enlarged sectional detail view of the valve and associated elements.

Figure 3 is a section along the line 3—3 in Figure 2.

Figure 4 is an enlarged detail view of a modified form of operating means for the valve.

Referring now more particularly to the drawings the reference character A designates generally the forepart of a planter frame carrying the seed hopper B, depended seed tube C, runner D and the oscillating laterally extended rock shaft E. This rock shaft E carries an arm or crank F which operates an upper valve G to drop the corn at periodic intervals through the seed tube C. The foregoing elements are conventional in construction and operation and need no further description.

In accordance with the present invention a trap door or gate 1 is hinged at 2 to the rear lower margin of the seed tube C where the same terminates within the runner D and an arm 3 is extended angularly downward and rearward from the door 1 adjacent its hinged end. An eye 4 is secured to the rear wall of seed tube C above the hinge 2 and a rod 5 is loosely pivoted to this eye, the lower end of the said rod passing loosely through the rear or outer end of the arm 3. An expansion coil spring 6 is mounted over the rod 5 and is braced between the arm 3 and eye 4 whereby the door 1 is normally held closed as shown in Figure 2. The valve proper comprises an arcuate or upwardly convexed base plate 7 having sides 8 vertically and upwardly extended from its margins and connected at their forward end by an upwardly extended end 9. A hood or apron 10 also arcuate or convexed upwardly is provided on the upper margin of the end 9 and is extended forwardly therefrom for some distance as shown at 11 as well as rearwardly for some distance over the base plate 7 as shown at 12. The foregoing construction is such that a pocket 13 is formed adjacent the end 9 between the sides 8, base plate 7 and rear end 12 of the hood 10. A bell crank lever 14 is provided and the end of its longer arm 15 is secured to the lower face of the valve's base plate 7 in any suitable manner. The bell crank lever is fulcrumed on a pin 16 extended horizontally between the sides 17 of the runner D below the end of the seed tube C, the location of this pin 16 being such that it is the center of the radii upon which the base plate 7 and hood 10 are curved or convexed as described. The rear end of the hood 10 terminates immediately under the lower edge of the forward wall of the seed tube C and does not obstruct said seed tube when the valve is in its normal position shown. The valve is so located that it may swing rearwardly beneath the lower end of the seed tube C, the rear end of the base plate 7 in this operation engaging the trap door 1 and forcing the same open to permit the passage of the valve. To facilitate this opening of the door 1 its lower edge 18 is curved rearward and the rear ends of the sides are curved or cut off bluntly as shown at 19. It will be noted that the rear ends of the sides 8 and rear margin of the base plate 7 normally rest in engagement with the trap door 1 so that the same is swung open instead of being struck and knocked or slammed open as the valve is swung rearwardly by a means to be described. This construction reduces wear on the parts and prevents rattling and like noises in operation.

An operating rod or link 20 is pivotally attached by its lower end at 21 to the shorter arm 22 of the bell crank lever 14 and is then offset laterally at 23 and passed upwardly alongside and clear of the hood 10 of the valve as best seen in Figure 3. The arm 20 passes loosely through a slot or opening 24 provided in the top 25 of the runner D and extends into proximity with and forwardly of the rock shaft E, this upper end of the rod being enlarged and provided with an apertured eye 26. A crank 27 similar to the aforesaid crank F and disposed diametrically opposite therefrom is provided on the rock shaft E and the eye 26 is pivotally attached to this crank in conventional manner.

In operation the proper number of kernels of corn as selected by the plates in the hopper B are dropped to the valve G from which they are released by a downward movement of the crank F in conventional manner. The corn then drops through the seed tube C and falls finally upon the valve base plate 7. Now another movement of the rock shaft E will raise the rod 20 resulting in a sudden and rapid swing of the valve rearwardly beneath the trap door 1. The corn resting on the plate 7 due to its inertia first slides back into the pocket 13 and is bunched therein and then as the valve's rearward movement is stopped the corn will be thrown forcibly from the pocket 13 by its momentum. The corn thus strikes the ground in a bunch and is not scattered as will be understood. Coincident with the rearward movement of the valve the upper valve G is again operated to drop more corn and this corn falls upon the hood 10 as the same is disposed beneath the seed tube C when the valve is swung rearwardly. As the valve returns to its normal position the corn is raked off the hood 10 onto the plate 7 by the forward wall of the tube C. The length and position of the hood 10 is such that it closes the lower end of the seed tube C when the valve is swung rearward and the aforementioned mounting of the hood immediately beneath the lower margin of the forward wall of the seed tube causes the corn to be raked from the hood as described. The forward movement of the valve in returning to its normal position is limited to the correct point by a stop located in any suitable position in the path of the valve as for instance depended from the runner top 25 as shown at 31. The adjustment and fitting of the various parts are of course sufficiently close to prevent loss of corn or the clogging of the valve by corn becoming stuck in any of the moving parts. As shown in Figure 4 the enlarged end or eye 26 of the operating rod 20 may be provided with an elongated aperture or slot 28 in which the crank 27 is pivoted. By the use of this construction, the rearward swing of the valve is started suddenly by the crank striking the upper end of the aperture 28 after the rock shaft E has gained some momentum. This elongated slot 28 also increases the speed at which the valve swings rearward due to the fact that the valve first remains stationary during the travel of the crank 27 from the lower to the upper end of the eye and then the valve must make its full rearward swing during the remaining part of the movement of the crank as will be understood. To stop the rearward swing of the valve sharply and at the correct point a resilient stop or cushion 29 is provided on the frame A against which the upper end of the rod 20 will strike as it is raised by the crank 27. A resilient cushion or stop 30 is also provided on the rear of the runner D to serve as a stop for the trap door 1 and to prevent rattling thereof.

From the foregoing it will be apparent that I have provided a very simple and efficient valve for the purposes described and one which will allow a much greater speed of the planter without causing scattering or uneven planting of the corn.

While I have herein set forth a certain preferred embodiment of my invention it is understood that I may vary from the same in minor structural details so as best to construct a practical device for the purposes intended, not departing from the spirit of the invention and within the scope of the appended claims.

I claim:

1. In a device of the kind described, in combination with the seed tube, runner, and rock shaft of a corn planter, a bell crank lever fulcrumed in the runner beneath the seed tube, a valve mounted beneath the seed tube and comprising an upwardly convexed base plate secured to the bell crank lever, sides and an end on the base plate, an upwardly convexed hood mounted on the upper margin of the end and extended at one end over a portion of the base plate and at its other end beyond the end of the base plate, a crank extended from the planter rock shaft, and an operating rod pivotally connected at its ends to the said bell crank lever and the crank.

2. In a device of the kind described, in combination with the seed tube, runner and rock shaft of a corn planter, a trap door hinged to the lower rear margin of the seed tube and spring set to normally depend downwardly therefrom, a bell crank lever fulcrumed in the runner below the seed tube, a valve comprising an upwardly convexed base plate secured to the bell crank lever forwardly of the trap door, sides upwardly extended from the base plate, an end portion upwardly extended from the forward end of the base plate, an upwardly convexed hood mounted intermediate its ends on the said end portion and extending rearwardly over the base plate and beneath the forward wall of the said tube, a crank mounted on the rock shaft, and an operating rod pivotally connected at its ends to the said bell crank lever and the crank.

In testimony whereof I affix my signature.

EDGAR B. YOUNG.